United States Patent [19]
Taniguchi et al.

[11] Patent Number: 5,823,070
[45] Date of Patent: Oct. 20, 1998

[54] AUTOMATIC TRANSMISSION

[75] Inventors: Takao Taniguchi, Okazaki; Nobuaki Miki, Kariya; Takenori Kano, Toyota; Toshiya Morishita, Hekinan; Naoto Ogasawara, Chiryu; Naotaka Murakami; Ken Kiyama, both of Nishio, all of Japan

[73] Assignee: Aisin Aw Co., Ltd., Japan

[21] Appl. No.: 721,710

[22] Filed: Oct. 4, 1996

[30] Foreign Application Priority Data

Oct. 6, 1995 [JP] Japan .................................. 7-260167

[51] Int. Cl.⁶ .................................................. F16H 57/02
[52] U.S. Cl. ...................... 74/606 R; 137/884; 137/270; 137/596.17
[58] Field of Search .......................... 74/606 R; 137/884, 137/270, 596.17

[56] References Cited

U.S. PATENT DOCUMENTS

| | | | |
|---|---|---|---|
| 4,678,006 | 7/1987 | Northman et al. ................. | 137/596.17 |
| 4,805,490 | 2/1989 | Fuehrer et al. .................... | 74/606 R X |
| 5,199,456 | 4/1993 | Love et al. ............................. | 137/270 |
| 5,259,271 | 11/1993 | Martin et al. ......................... | 74/606 R |
| 5,611,372 | 3/1997 | Bauer et al. .......................... | 137/884 |

*Primary Examiner*—Vinh T. Luong
*Attorney, Agent, or Firm*—Lorusso & Loud

[57] ABSTRACT

An automatic transmission includes a casing housing a transmission mechanism and having a wall with a through-hole. A first plurality of electronic components is mounted exterior to the casing and a second plurality of electronic components is mounted on the interior of the casing. A sealed wire terminal is mounted in and closes the through-hole 21. An electronic control unit is mounted in the sealed wire terminal 22 and cables electrically connect the electronic control unit to the first and second pluralities of electronic components. The sealed wire terminal includes a seal member supporting the cables and sealing the through-hole. Thus, the automatic transmission and the electronic control unit can be combined before mounting on a vehicle.

9 Claims, 7 Drawing Sheets

FIG. 2
PRIOR ART
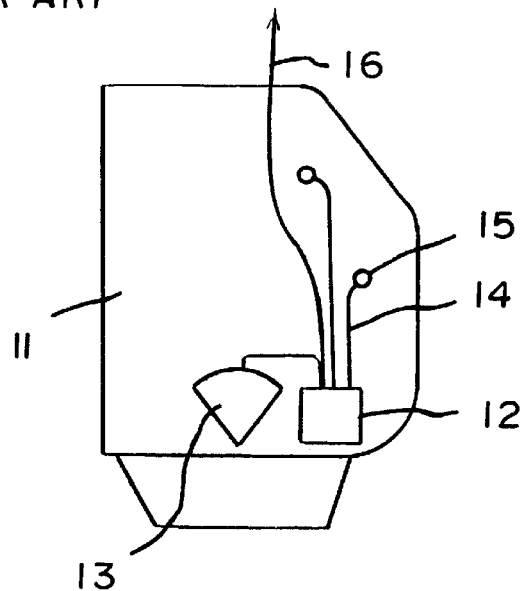
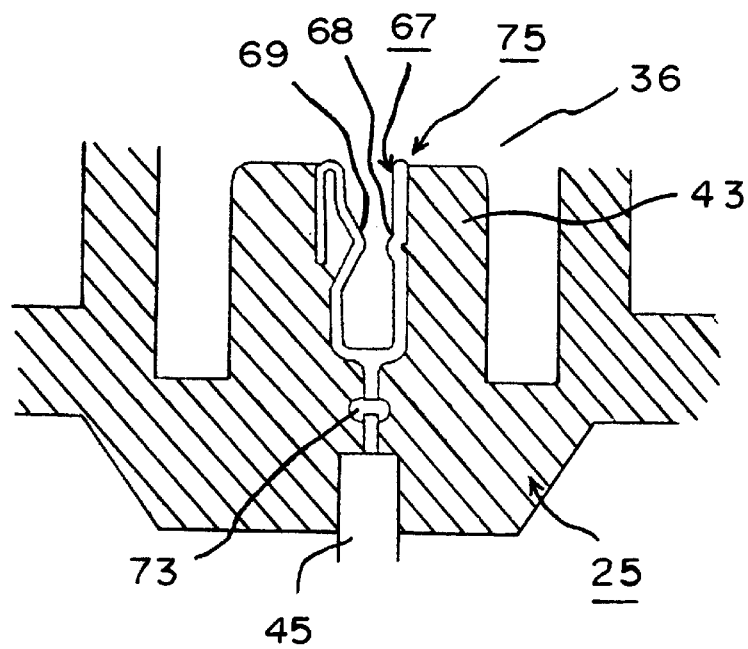
FIG. 3

AUTOMATIC TRANSMISSION

BACKGROUND OF THE INVENTION

1. Field of the Invention

The present invention relates to an automatic transmission.

2. Related Art

A conventional automatic transmission changes speeds automatically, in accordance with the running conditions. In a gear type automatic transmission, for example, a given gear stage is automatically selected and established responsive to a change in a running condition. For this purpose, a control system is provided to control the various solenoid valves of a hydraulic circuit on the basis of the running conditions detected by various sensors and thereby changes the engagement of the gears and establishes a new gear ratio.

The aforementioned control system is packaged as an electronic control unit (ECU) and mounted in a vehicular compartment. On the other hand, the electronic components such as the solenoid valves and the sensors are arranged together with the automatic transmission in the engine housing because they must be fixed on the automatic transmission. In prior art automatic transmissions, however, a large number of adjustments must be made to the automatic transmission and the control system. Specifically, the automatic transmission and the electronic control unit are manufactured separately and are combined with each other when they are mounted on the vehicle. This makes it necessary not only for the automatic transmission and the electronic control unit to be adjusted at the manufacturing stage, before they are mounted on the vehicle, but also for the entire automatic transmission system to be adjusted after mounting on the vehicle. Moreover, the automatic transmission and electronic control unit are separated by a distance requiring elongated connecting wiring which raises the cost and complicates trouble-shooting of the wiring system.

In view of the foregoing, an arrangement as shown in FIG. 2 has been proposed. In FIG. 2: reference numeral 11 designates the casing of an automatic transmission; numeral 12 an electronic control unit mounted on the casing 11; numeral 13 a neutral switch; numeral 14 a cable; numeral 15 a sensor; and numeral 16 a cable extending into the vehicle compartment from control components including a mode switch and an engine controlling computer. Incidentally, the electronic control unit 12 and the cable 14, and the sensor 15 and the cable 14 are separately connected by connectors (not shown).

Because the electronic control unit 12 is thus mounted on the casing 11, the automatic transmission system can be adjusted in its entirety prior to mounting on the vehicle. This makes it possible to reduce the number of adjustments. Moreover, since the cable 14 between the automatic transmission and the electronic control unit 12 is shorter as compared with the more conventional arrangement, the cost can be reduced and the wiring operation can be simplified.

If, however, the electronic control unit 12 is mounted in the engine compartment, it may become contaminated by muddy water or the like. It is, therefore, necessary to provide a seal for the electronic control unit 12 itself and for the connector connecting the electronic control unit 12 and the cable 14. As a result, the number of parts is increased, raising the cost.

SUMMARY OF THE INVENTION

Accordingly, an object of the present invention is to provide a solution to the above-described problems associated with the automatic transmission of the prior art. Another object is to provide an automatic transmission which requires a smaller number of steps to adjust the automatic transmission system in its entirety. Yet another object is to reduce the cost, to simplify the wiring operation, to lighten the wiring, to provide good seals and to reduce the number of parts.

In order to achieve the above-specified objects, the present invention provides an automatic transmission including a casing housing a transmission mechanism therein and having a through hole, a first plurality of electronic components mounted exterior to the casing and a second plurality of electronic components mounted inside the casing. A sealed wire terminal is mounted in the through hole and an electronic control unit is housed within the sealed wire terminal. Wire cables serve to electrically connect the electronic control unit and the various electronic components.

Moreover, the sealed wire terminal supports the cables and has seal members forming seals with the interior and exterior surfaces of the casing.

In a preferred embodiment of the present invention, the sealed wire terminal includes two case elements, each having a connector for electrically connecting the electronic control unit with a cable.

In yet another embodiment of the present invention, the electronic control unit is housed within a space defined between the two cases, and the seal member(s) seals this space from the exterior of the case.

BRIEF DESCRIPTION OF THE DRAWINGS

FIG. 2 is a schematic diagram showing a prior art wiring arrangement for an automatic transmission;

FIG. 3 is an enlarged cross-sectional view showing part of a section taken along line 1—1 in FIG. 1 and showing detail of a connector of the sealed wire terminal according to the first embodiment of the present invention;

DESCRIPTION OF THE PREFERRED EMBODIMENTS

Embodiments of the present invention will now be described with reference to the accompanying drawings.

Figure 1:
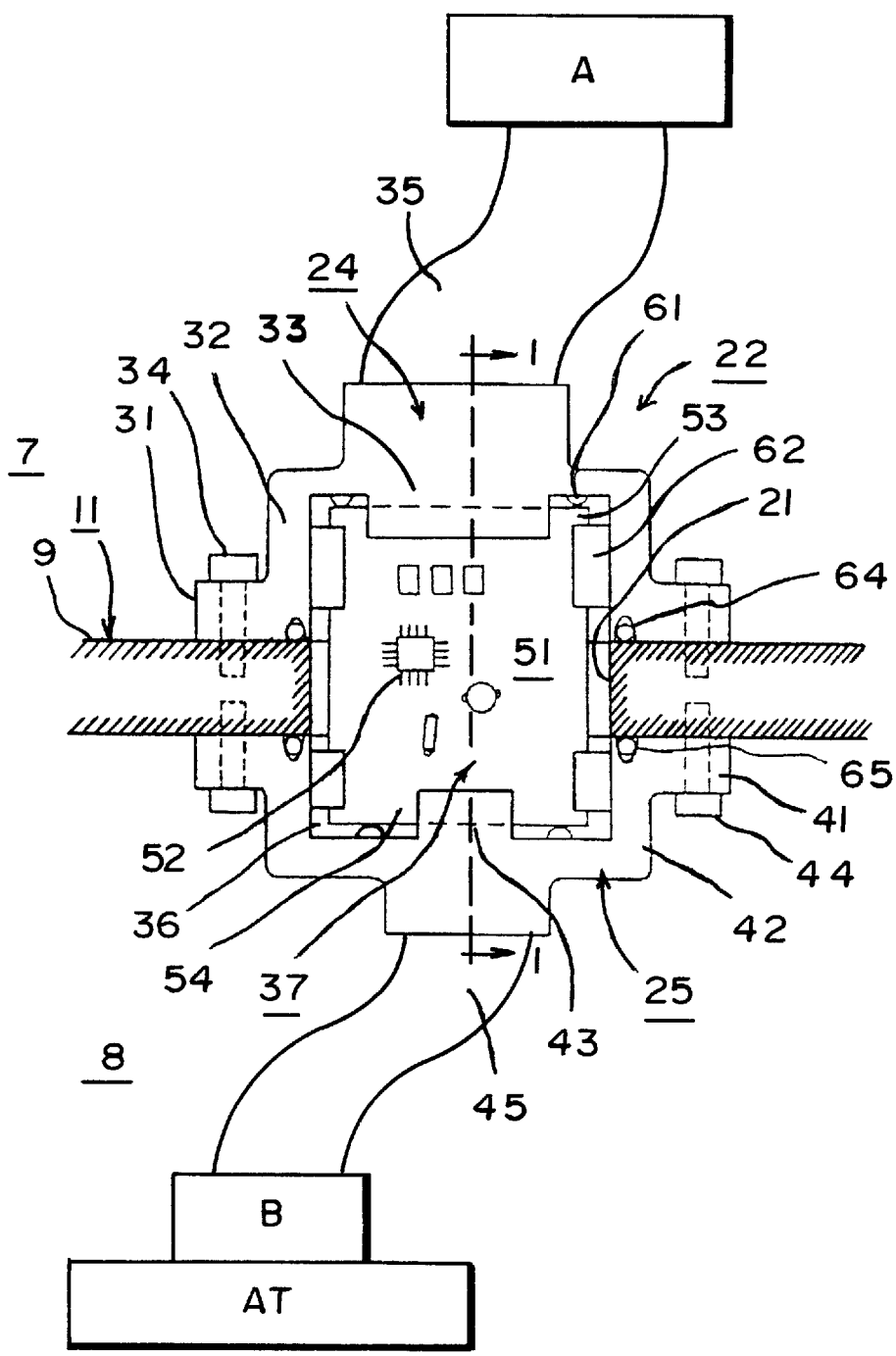
FIG. 1 is a sectional view showing a sealed wire terminal according to a first embodiment of the present invention.

In FIG. 1, reference numeral 11 designates the casing of an automatic transmission. A first plurality of electronic components A, such as a control switch, are mounted on the exterior 7 (located in the upper portion of FIG. 1) of the transmission casing 11, and the speed change mechanism AT and a second plurality of electronic components B, such as a solenoid and a sensor, are mounted in the interior 8 (as located at the lower portion of FIG. 1) of the transmission casing 11.

The transmission casing 11 has a wall 9 with a through hole 21, for providing communication between the external and internal electronic components, in which is inserted a sealed wire terminal 22.

This sealed wire terminal 22 is formed of two case elements 24 and 25 made of a resin highly resistant to heat and oil. The case element 24 is arranged on the outer side of the transmission casing 11, and the case element 25 is arranged on the inner side. Further, the case element 24 has a flange portion 31 in abutment against the outer surface of the transmission casing 11, a recessed portion 32 formed as a bulge extending from the flange portion 31 to the exterior of the transmission casing 11 and a connection portion 33 arranged in the bottom of the recessed portion 32. The case element 24 is fixed on the transmission casing 11 by means of bolts 34 extending through the flange 31. On the other hand, the case element 25 is composed of a flange portion 41 in abutment against the interior surface of the transmission casing 11, a recessed portion 42 extending from the flange portion 41 to the interior of the transmission casing 11 and a connector 43 mounted in the bottom of the recessed portion 42. The case element 25 is fixed on the transmission casing 11 by means of bolts 44 extending through the flange portion 41.

When the case elements 24 and 25 are fixed on the casing 11 facing each other, a space 36 is defined between the two recesses 32 and 42. In this space 36 is housed an electronic control unit 37 in which a control system is packaged. This electronic control unit 37 is composed of a ceramic board 51 and at least one chip 52 mounted on the board 51.

Electronic control unit 37 must be electrically connected both to the electronic components A exterior to the transmission casing 11 and electronic components B located inside the transmission casing 11.

Thus, the electronic control unit 37 and a cable 35 are electrically connected by the connection portion 33, and the electronic control unit 37 and a cable 45 are electrically connected by the connection portion 43.

No separate component is required to fix the electronic control unit 37 to the sealed wire terminal 22 so that the number of parts can be reduced.

Electrodes (not shown) are formed at the ends 53 and 54 of the electronic control unit 37, and are electrically connected to connectors (e.g. 75 in FIG. 3) mounted in connection portions 33 and 43, which correspond to the aforementioned electrodes.

Board fixing guides 61 and 62 protrude from the inner surfaces of the cases 24 and 25 for guiding the electronic control unit 37 into position and for securing it there.

On the faces of the flange portions 31 and 41 abutting the casing 11 are circumferentially arranged seal rings 64 and 65. These seal rings 64 and 65 serve as sealing means for sealing and isolating the interior space 36 from the exterior.

Connection portions 33 and 43 will now be described with reference to FIGS. 3–5 and with reference to connection portion 43 (connection portion 33 is identical).

Figure 4:
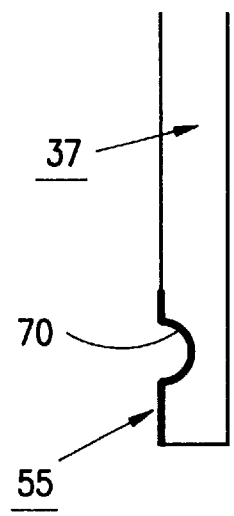
FIG. 4 is a partial, enlarged view of a portion of the electronic control unit in the first embodiment of the present invention.
Figure 5:
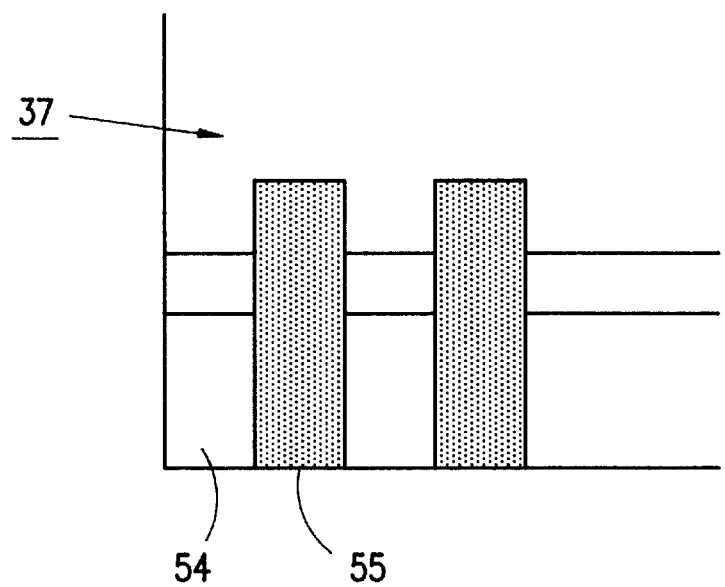
FIG. 5 is a top plan view showing the electronic control unit in the first embodiment of the present invention.

In FIGS. 3–5: reference numeral 25 designates the case element; numeral 43 the connection portion attached to the case element 25; numeral 36 the space for confining the electronic control unit 37; and numeral 45 a cable for electrically connecting the electronic control unit 37 with electronic components (not shown) inside the casing 11. In the connection portion 43 is mounted a connector 75 having a plurality of electrodes 67, and this connector 75 and the cable 45 are connected by means of solder 73. This connection between the connector 75 and the cable 45 is enclosed within the resin of the case element 25. On the other hand, the individual electrodes 67 are made of elastic metal strips having inward projections 68 and 69.

Moreover, a plurality of electrodes 55, corresponding to the individual electrodes 67, are formed at the end portions 54 of the electronic control unit 37. These electrodes 67 and 55 are electrically connected by inserting the end portion 54 of the electronic control unit 37 into the connector 75.

Each of the electrodes 55 has a groove 70 which receives the projection 69 so that it is held in place by the mating fit between the projection 69 and the groove 70.

Thus, the automatic transmission and the electronic control unit 37 can be arranged in close proximity and combined for mounting on the vehicle. As a result, the number of steps required for proper adjustments can be reduced because the automatic transmission system can be adjusted as a whole after it is mounted on the vehicle.

Since the automatic transmission and the electronic control unit 37 are arranged in close proximity, the cable connecting the two can be shortened to lower the cost, simplify the wiring and lighten the assembly.

Because the electronic control unit 37 is mounted within the space 36, and this space 36 is sealed by the seal rings 64 and 65, the electronic control unit 37 is protected from contamination by dirty water and the like. As a result, the sealing function of the sealed wire terminal 22 can be utilized to seal the electronic control unit 37 itself and to seal the connector 75, so that the electronic control unit 37 itself and the connector 75 need not have additional seal structure. As a result, the number parts can be reduced to lower the cost.

Because the electronic control unit 37 is mounted within the sealed wire terminal 22 separate from the other functional components, the other function components need not be disturbed when the electronic control unit 37 is replaced.

Merely by loosening the bolts 34 to remove the case element 24, the electronic control unit 37 can be removed from the space 36, thus facilitating replacement of the electronic control unit 37.

A second embodiment of the present invention will now be described with reference to FIGS. 6–8.

Figure 6:
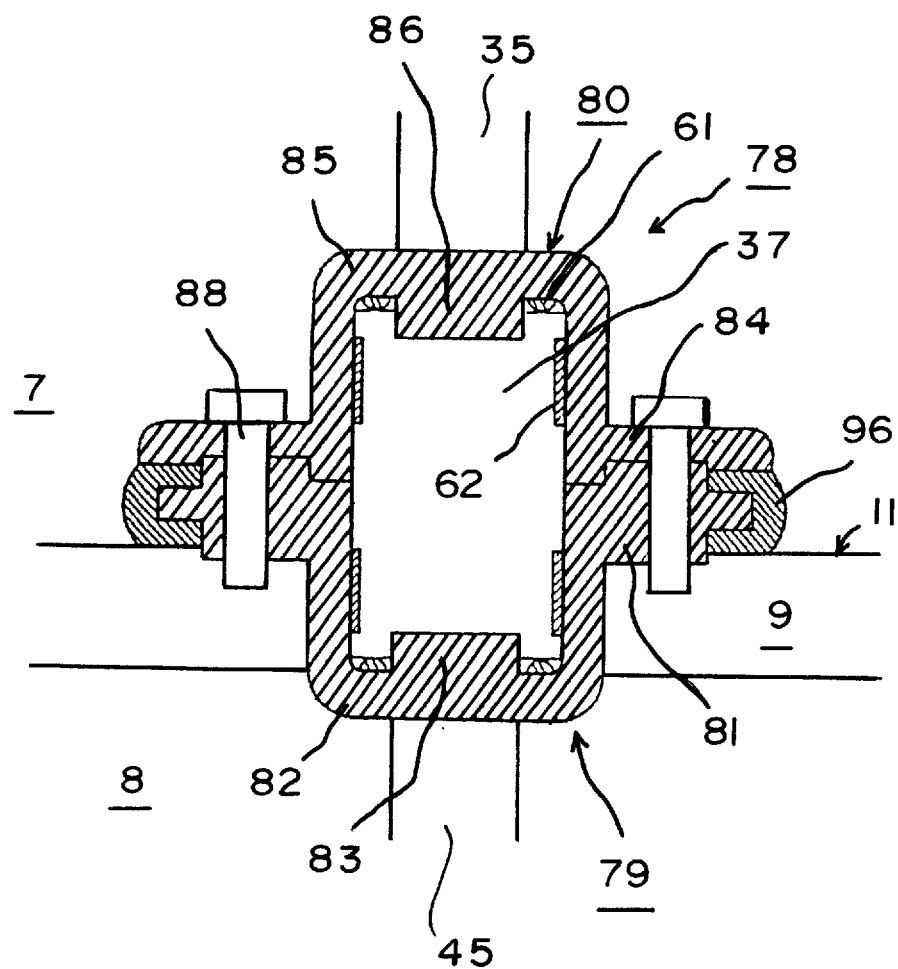
FIG. 6 is a transverse, cross-sectional view in a first vertical plane, of a sealed wire terminal according to a second embodiment of the present invention.
Figure 7:
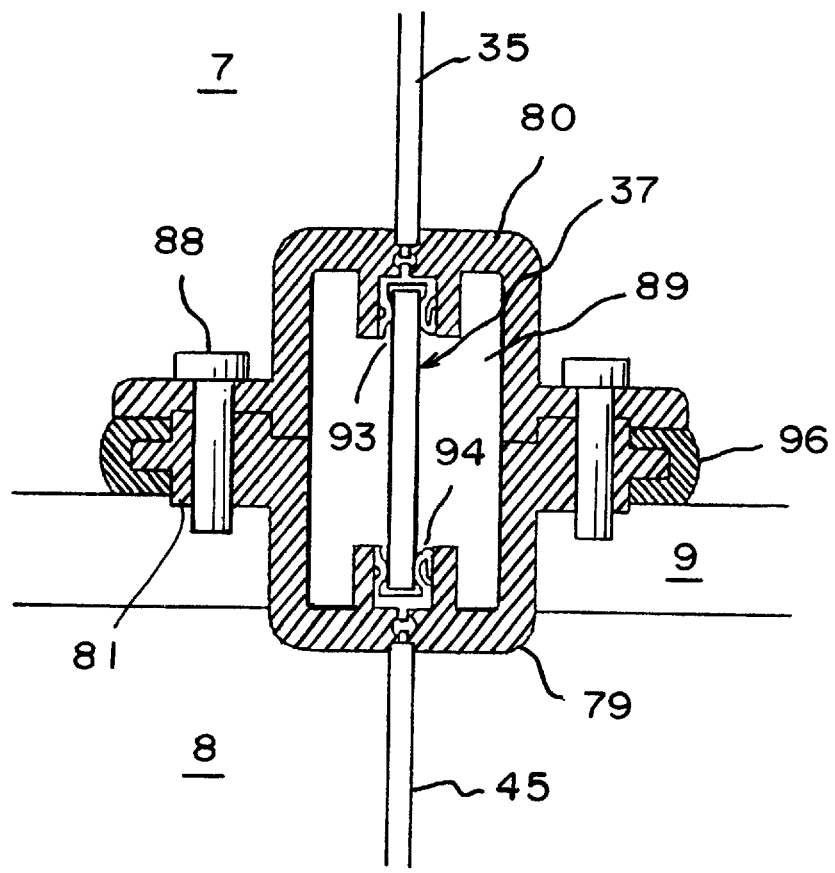
FIG. 7 is a cross-sectional view, in a second vertical plane perpendicular to the first vertical plane, of the sealed wire terminal of the second embodiment.
Figure 8:
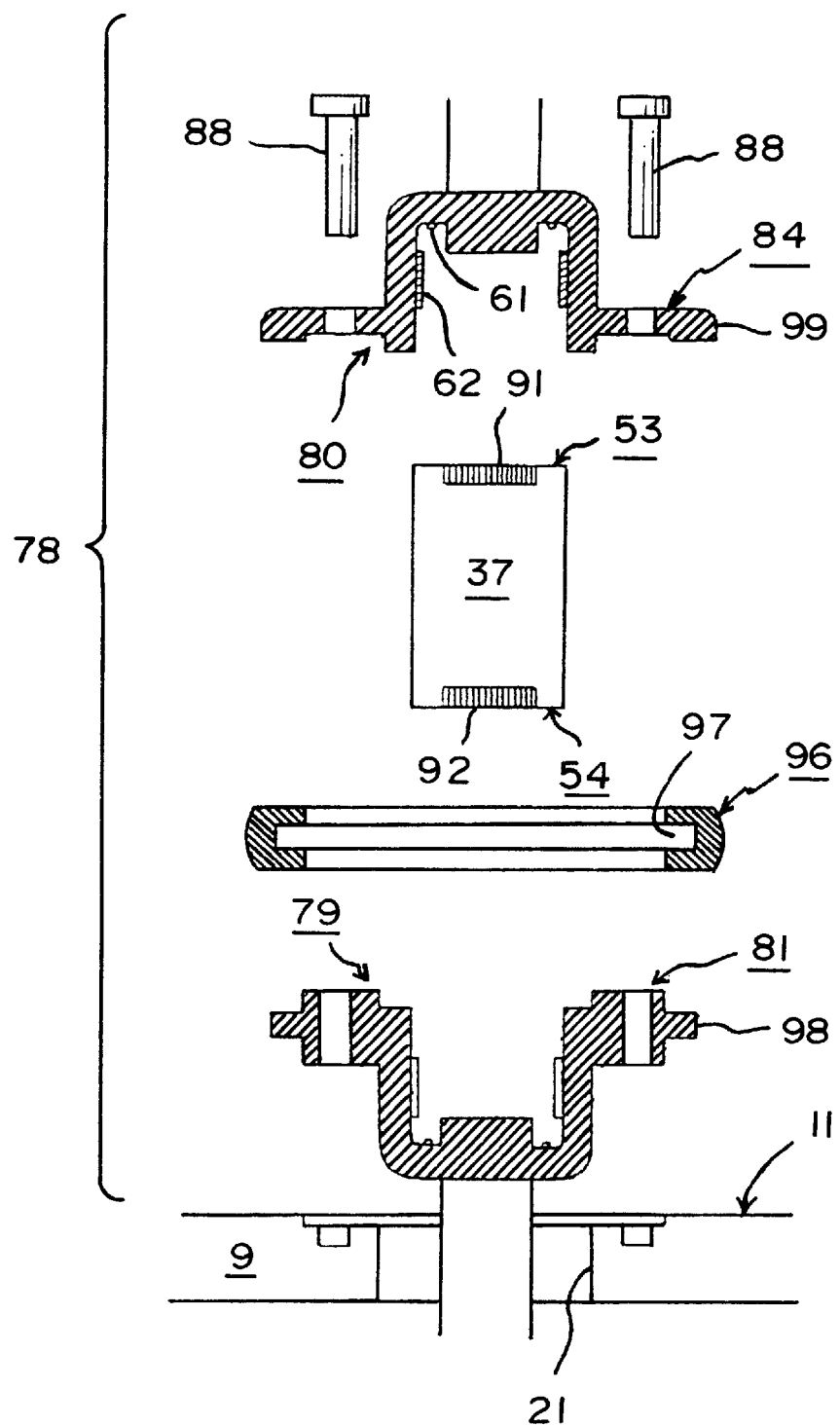
FIG. 8 is an exploded, cross-sectional view, along the first vertical plane of FIG. 6, of the sealed wire terminal according to the second embodiment of the present invention.

In FIGS. 6–8, numeral 11 designates the casing of an automatic transmission. The first plurality of electronic components A, such as a control switch, are arranged exterior to (on the upper side of FIG. 1) the transmission casing 11, and the speed change mechanism AT and the second plurality of electronic components B, such as a solenoid or a sensor, are arranged on the interior (lower side of FIG. 1) of the same.

In the transmission casing 11 there is formed a through hole 21 for providing communication between the exterior and interior of the casing at a predetermined location in the casing 11. In this through hole 21, is mounted sealed wire terminal 22.

Sealed wire terminal 78 is formed of two case elements 79 and 80 made of a resin highly resistant to heat and oil. Case element 79 is mounted abutting the casing 11, and case element 80 is mounted on case element 79. Case element 79 is composed of a flange portion 81 which is mounted in abutment against the outer surface of the casing 11, a recessed portion 82 forming a bulge extending from the flange portion 81 and a connector portion 83 formed in the bottom of the recessed portion 82. On the other hand, the case 80 is composed of a flange portion 84 which is mounted in abutment against the outer surface of the flange portion 81, a recessed portion 85 forming a bulge extending from the flange portion 84 toward the exterior of the casing 11 and a connection portion 86 formed in the bottom face of the recessed portion 85. The case elements 79 and 80 are fixed to the casing 11 by means of bolts 88 extending through the flange portions 81 and 84.

When the case elements 79 and 80 are fixed on the casing 11, a space 89 is defined by the two recessed portions 82 and 85. This space 89 houses an electronic control unit 37 in which a control system is packaged.

As in the previous embodiment, the electronic control unit 37 must be electrically connected to both the electronic components exterior to the casing 11 and the electronic components arranged inside the casing 11. Thus, the electronic control unit 37 and a cable 35 are electrically connected by the connection portion 86, and the electronic control unit 37 and a cable 45 are electrically connected by the connection portion 83, so that the electronic control unit 37 is held between connection portions 83 and 86.

Electrodes 91 and 92 are formed at the end portions 53 and 54 of the electronic control unit 37 and mate with connectors 93 and 94 mounted in connection portions 83 and 86.

Board fixing guides 61 and 62, for guiding the electronic control unit 37 into position and fixing it there, protrude from the inner surfaces of the case elements 79 and 80.

A seal ring 96 is arranged around the circumference of the flange portion 81. The seal ring 96 has a section defining a groove 97 opening at its inner circumference, and the flange portion 81 is formed with an annular protrusion 98 which fits within the groove 97. In the flange portion 84, there is formed an annular holding portion 99 which extends radially outward of the flange portion 81. As best seen in FIGS. 7, when the flange portions 81 and 84 are fixed on the casing 11 by the bolts 88, the seal ring 96 is compressed against the exterior surface of the casing by the holding portion 99 to thereby form a seal between the flange portion 81 and the casing 11, and the flange portion 81 and the flange portion 84. As a result, the seal ring 96 can seal not only the space 89, but also the through-hole of the casing 11.

Figure 9:
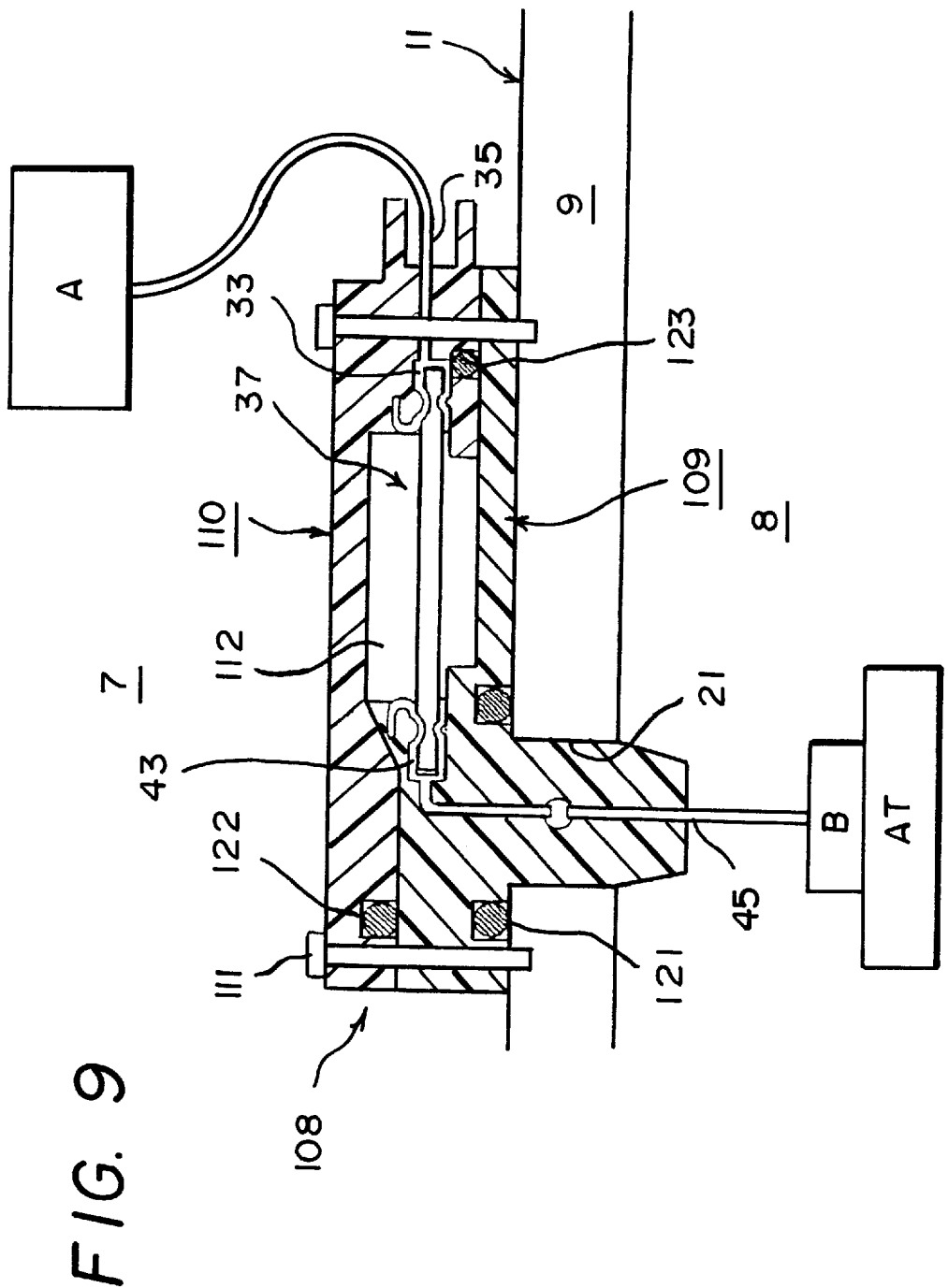
FIG. 9 is a cross-sectional view as of a third embodiment of a sealed wire terminal in accordance with the present invention.

The automatic transmission is mounted within limited space in the engine compartment. Because the sealed wire terminals 22 (as shown in FIG. 1) and 78 (as shown in FIG. 6) protrude from the exterior of the casing 11, they may interfere with the other parts such as the battery. Thus, a third embodiment, as depicted in FIG. 9, is provided to cope with such a situation. In this third embodiment, the electronic control unit 37 and the casing 11 are arranged in parallel. In FIG. 9, reference numeral 11 again designates the casing of an automatic transmission. A through-hole 21 provides communication between the exterior 7 and interior 8 of the transmission casing 11 and a sealed wire terminal 108 is mounted in the through-hole 21.

This sealed wire terminal 108 is formed of two case elements 109 and 110 made of a resin highly resistant to heat and oil. The case element 109 is mounted flush against the transmission casing 11, and the case element 110 is mounted on case element 109.

When the case elements 109 and 110 are fixed together on the case 11 by means of bolts 111, a space 112 is formed therebetween. In this space 112 is mounted the electronic control unit 37 in which the control system is packaged.

Since the electronic control unit 37 and the transmission casing 11 are arranged in parallel, the sealed wire terminal 108 protrudes less from the exterior 7 of the transmission casing 11. As a result, the sealed wire terminal 108 and other parts, such as the battery, do not interfere with each other.

Further, in FIG. 9, reference numerals 34 and 45 designate cables, numeral 121 designates an O-ring, forming a seal for the case 109 and the casing 11, and numerals 122 and 123 designate seal rings, i.e. sealing means, for sealing the case elements 109 and 110.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:
   a transmission casing defining a casing interior housing a transmission mechanism and having a wall with a through-hole;
   a first plurality of electronic components mounted exterior to said casing;
   a second plurality of electric components mounted within the interior of said transmission casing;
   a sealed wire terminal mounted in and closing said through-hole, said sealed wire terminal having a sealed interior space;
   an electronic control unit mounted within said sealed interior space of said wire terminal;
   electrical cables connecting said electronic control unit with said first and second pluralities of electronic components, said sealing wire terminal supporting ends of said cables; and
   sealing means for forming a seal between said transmission casing, surrounding said through-hole, and said sealed wire terminal, and for isolating said sealed interior space from said casing interior.

2. An automatic transmission according to claim 1, wherein said sealed wire terminal includes two case elements, each of said case elements having a connector for electrically connecting said electronic control unit to said cables.

3. An automatic transmission according to claim 2, wherein said electronic control unit is fixed in position between said connectors.

4. An automatic transmission according to claim 2, wherein said two case elements include respective flange portions abutting against opposing surfaces of said wall of said casing.

5. An automatic transmission according to claim 4, wherein each of said flange portions has a recess receiving an O-ring surrounding said through-hole, said O-ring serving as said sealing means.

6. An automatic transmission according to claim 2, wherein one of said two case elements includes a flange portion having an annular protrusion extending therefrom parallel to said wall of said casing and wherein said sealing means is a groove ring fitted over said annular protrusion and forming seals with both a flange portion of the other of said two case elements and with said wall of said casing.

7. An automatic transmission according to claim 1, wherein said electronic control unit comprises a circuit board mounted perpendicular to said wall of said casing.

8. An automatic transmission according to claim 1, wherein said electronic control unit comprises a circuit board mounted perpendicular to said wall of said casing.

9. An automatic transmission according to claim 1, wherein said electronic control unit comprises a circuit board mounted parallel to said wall of said transmission casing.

* * * * *